(12) United States Patent
Choi et al.

(10) Patent No.: US 11,894,548 B2
(45) Date of Patent: Feb. 6, 2024

(54) NEGATIVE ELECTRODE ACTIVE MATERIAL, METHOD OF PREPARING THE NEGATIVE ELECTRODE ACTIVE MATERIAL, NEGATIVE ELECTRODE, AND SECONDARY BATTERY INCLUDING THE NEGATIVE ELECTRODE

(71) Applicant: LG CHEM, LTD., Seoul (KR)

(72) Inventors: Hee Won Choi, Daejeon (KR); Jae Wook Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 422 days.

(21) Appl. No.: 17/264,097

(22) PCT Filed: Aug. 16, 2019

(86) PCT No.: PCT/KR2019/010432
§ 371 (c)(1),
(2) Date: Jan. 28, 2021

(87) PCT Pub. No.: WO2020/036461
PCT Pub. Date: Feb. 20, 2020

(65) Prior Publication Data
US 2021/0305551 A1   Sep. 30, 2021

(30) Foreign Application Priority Data
Aug. 17, 2018  (KR) .................. 10-2018-0096155

(51) Int. Cl.
*H01M 4/36* (2006.01)
*C01B 32/205* (2017.01)
(Continued)

(52) U.S. Cl.
CPC .......... *H01M 4/366* (2013.01); *C01B 32/205* (2017.08); *C01B 32/21* (2017.08); *H01M 4/133* (2013.01);
(Continued)

(58) Field of Classification Search
None
See application file for complete search history.

(56) References Cited

U.S. PATENT DOCUMENTS

2010/0035149 A1    2/2010  Fujiwara et al.
2014/0255292 A1*   9/2014  Wakizaka ............. H01M 4/587
                                                    423/448

(Continued)

FOREIGN PATENT DOCUMENTS

CN   102931381 A   2/2013
CN   104039697 A   9/2014
(Continued)

OTHER PUBLICATIONS

Extended European Search Report for European Application No. 19850420.1, dated Aug. 4, 2021.
(Continued)

*Primary Examiner* — Wyatt P Mcconnell
(74) *Attorney, Agent, or Firm* — Birch, Stewart, Kolasch & Birch, LLP

(57) ABSTRACT

A negative electrode active material which includes a core including artificial graphite, and a carbon coating layer disposed on the surface of the core, wherein an edge plane of the negative electrode active material has a specific surface area of 1.0 m²/g to 1.9 m²/g, a negative electrode including the same, and a secondary battery including the negative electrode.

13 Claims, 1 Drawing Sheet

(51) Int. Cl.
*C01B 32/21* (2017.01)
*H01M 4/133* (2010.01)
*H01M 4/587* (2010.01)
*H01M 10/0525* (2010.01)
*H01M 4/02* (2006.01)

(52) U.S. Cl.
CPC ....... *H01M 4/587* (2013.01); *H01M 10/0525* (2013.01); *C01P 2004/50* (2013.01); *C01P 2004/61* (2013.01); *C01P 2004/84* (2013.01); *C01P 2006/12* (2013.01); *C01P 2006/40* (2013.01); *H01M 2004/021* (2013.01); *H01M 2004/027* (2013.01)

(56) References Cited

U.S. PATENT DOCUMENTS

| | | |
|---|---|---|
| 2014/0335428 A1 | 11/2014 | Wakizaka et al. |
| 2015/0162600 A1 | 6/2015 | Wakizaka et al. |
| 2015/0255793 A1* | 9/2015 | Wakizaka ............... C01B 32/21 252/182.1 |
| 2017/0033360 A1 | 2/2017 | Michaud et al. |
| 2018/0009665 A1* | 1/2018 | Kawaguchi ......... H01M 4/1393 |
| 2018/0013146 A1 | 1/2018 | Yamada et al. |
| 2018/0123120 A1 | 5/2018 | Lee et al. |
| 2018/0190985 A1 | 7/2018 | Choi et al. |
| 2018/0226649 A1 | 8/2018 | Wakizaka et al. |
| 2019/0229325 A1 | 7/2019 | Ahn et al. |
| 2019/0305308 A1 | 10/2019 | Lee et al. |
| 2022/0123308 A1 | 4/2022 | Yamada et al. |
| 2022/0123309 A1 | 4/2022 | Yamada et al. |
| 2022/0123310 A1 | 4/2022 | Yamada et al. |
| 2022/0123311 A1 | 4/2022 | Yamada et al. |

FOREIGN PATENT DOCUMENTS

| | | |
|---|---|---|
| CN | 104685680 A | 6/2015 |
| CN | 105355841 A | 2/2016 |
| CN | 107851795 A | 3/2018 |
| CN | 101641285 A | 12/2023 |
| CN | 107112536 A | 12/2023 |
| EP | 3 246 974 A1 | 11/2017 |
| EP | 3 316 378 A1 | 5/2018 |
| JP | 2000-348720 A | 12/2000 |
| JP | 5644022 B2 | 12/2014 |
| JP | 2015-174630 A | 10/2015 |
| JP | 2016-170930 A | 9/2016 |
| JP | 4840449 B2 | 9/2016 |
| KR | 10-2009-0104129 A | 10/2009 |
| KR | 10-2015-0027167 A | 3/2015 |
| KR | 10-2015-0088752 A | 8/2015 |
| KR | 10-2017-0002302 A | 1/2017 |
| KR | 10-2017-0048210 A | 5/2017 |
| KR | 10-2017-0075661 A | 7/2017 |
| KR | 10-2018-0007618 A | 1/2018 |
| KR | 10-2018-0035693 A | 4/2018 |

OTHER PUBLICATIONS

International Search Report (PCT/ISA/210) issued in PCT/KR2019/010432, dated Nov. 22, 2019.

* cited by examiner

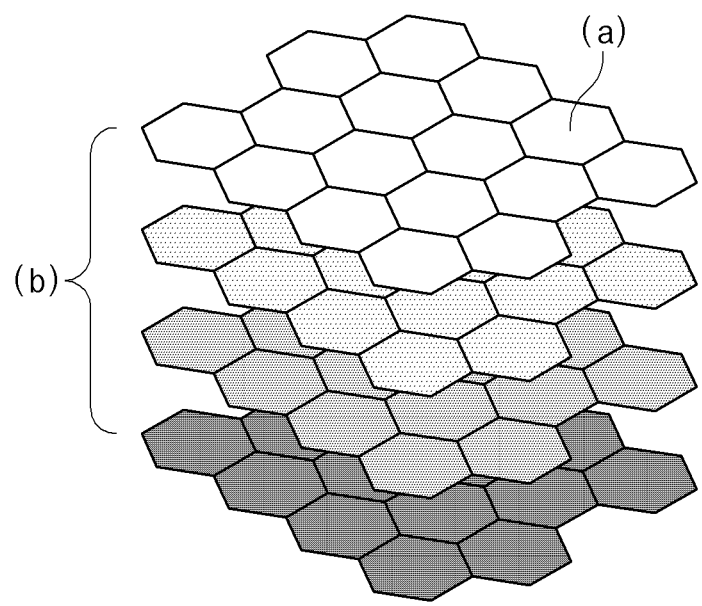

NEGATIVE ELECTRODE ACTIVE MATERIAL, METHOD OF PREPARING THE NEGATIVE ELECTRODE ACTIVE MATERIAL, NEGATIVE ELECTRODE, AND SECONDARY BATTERY INCLUDING THE NEGATIVE ELECTRODE

CROSS-REFERENCE TO RELATED APPLICATIONS

This application claims the benefit of Korean Patent Application No. 10-2018-0096155, filed on Aug. 17, 2018, in the Korean Intellectual Property Office, the disclosure of which is incorporated herein in its entirety by reference.

TECHNICAL FIELD

The present invention relates to a negative electrode active material, which includes a core including artificial graphite; and a carbon coating layer disposed on the core, wherein an edge plane has a specific surface area of 1.0 m²/g to 1.9 m²/g, a method of preparing the negative electrode active material, a negative electrode, and a secondary battery including the negative electrode.

BACKGROUND ART

Demand for batteries as an energy source has been significantly increased as technology development and demand with respect to mobile devices have recently increased, and a variety of researches on batteries capable of meeting various needs have been carried out accordingly. Particularly, as a power source for such devices, research into lithium secondary batteries having excellent lifetime and cycle characteristics as well as high energy density has been actively conducted.

A lithium secondary battery denotes a battery in which a non-aqueous electrolyte containing lithium ions is included in an electrode assembly which includes a positive electrode including a positive electrode active material capable of intercalating/deintercalating the lithium ions, a negative electrode including a negative electrode active material capable of intercalating/deintercalating the lithium ions, and a microporous separator disposed between the positive electrode and the negative electrode. A lithium metal, a lithium alloy, a carbon-based active material, and a silicon-based active material are being used as the negative electrode active material.

Various types of carbon-based materials, such as artificial graphite, natural graphite, and hard carbon, have been used as the carbon-based active material, and, among them, a graphite-based active material capable of ensuring life characteristics of the lithium secondary battery due to excellent reversibility has been most widely used. With respect to the graphite-based active material, since a discharge voltage against lithium is low at −0.2 V, a battery using the graphite-based active material may exhibit a high discharge voltage of 3.6 V, and thus, the graphite-based active material offers many advantages in terms of energy density of the lithium battery.

The temperature of the secondary battery increases during its use, and, accordingly, deterioration of function of the secondary battery during high-temperature storage may occur. Particularly, since a side reaction between the negative electrode and an electrolyte solution occurs during high-temperature storage and lithium to participate in a reversible reaction is lost, there is a limitation in that capacity remaining after the high-temperature storage is small.

Conventionally, a technique of preparing a negative electrode by mixing artificial graphites with different particle diameters has been introduced to suppress the deterioration of the function of the secondary battery during the high-temperature storage. However, this technique is undesirable in that energy density of the negative electrode is reduced by low capacity of the artificial graphite with a relatively smaller diameter and the side reaction between the negative electrode and the electrolyte solution does not resolve smoothly.

Thus, there is a need for a new technique which may minimize side reaction sites between the negative electrode and the electrolyte solution during high-temperature storage and may minimize the loss of lithium participating in the reversible reaction.

DISCLOSURE OF THE INVENTION

Technical Problem

An aspect of the present invention provides a negative electrode active material, which may minimize side reaction sites between a negative electrode and an electrolyte solution during high-temperature storage and may minimize the loss of lithium participating in a reversible reaction, a method of preparing the negative electrode active material, a negative electrode, and a secondary battery including the negative electrode.

Technical Solution

According to an aspect of the present invention, there is provided a negative electrode active material which includes: a core including artificial graphite; and a carbon coating layer disposed on a surface of the core, wherein an edge plane of the negative electrode active material has a specific surface area of 1.0 m²/g to 1.9 m²/g.

According to another aspect of the present invention, there is provided a method of preparing a negative electrode active material which includes: preparing needle cokes; crushing the needle cokes at a pressure of 10 MPa to 20 MPa; after mixing the crushed needle cokes with a carbonaceous precursor, preparing a core by performing a heat treatment at a temperature of 3,000° C. or more; and forming a carbon coating layer on the core.

According to another aspect of the present invention, there is provided a negative electrode including a current collector and a negative electrode active material layer disposed on the current collector, wherein the negative electrode active material layer includes a negative electrode active material, wherein the negative electrode active material includes a core including artificial graphite; and a carbon coating layer disposed on the core, wherein an edge plane has a specific surface area of 0.5 m²/g to 1.1 m²/g.

According to another aspect of the present invention, there is provided a secondary battery including the negative electrode; a positive electrode; a separator disposed between the positive electrode and the negative electrode; and an electrolyte.

Advantageous Effects

According to the present invention, a side reaction between a negative electrode and an electrolyte solution during high-temperature storage may be suppressed by using a negative electrode active material including artificial graphite in which a specific surface area of an edge plane causing a side reaction with the electrolyte solution is small, and, as a result, the loss of lithium to participate in a reversible reaction may be reduced. Accordingly, initial efficiency and capacity retention during high-temperature storage of a battery prepared may be improved.

BRIEF DESCRIPTION OF THE DRAWINGS

The following drawing attached to the specification illustrate preferred examples of the present invention by example, and serve to enable technical concepts of the present invention to be further understood together with detailed description of the invention given below, and therefore the present invention should not be interpreted only with matters in such drawings.

The FIGURE is a schematic view illustrating artificial graphite included in a negative electrode active material of the present invention.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The expression "average particle diameter ($D_{50}$)" in the present specification may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

<Negative Electrode Active Material>

A negative electrode active material according to an embodiment of the present invention includes a core including artificial graphite; and a carbon coating layer disposed on a surface of the core, wherein an edge plane of the negative electrode active material may have a specific surface area of 1.0 $m^2$/g to 1.9 $m^2$/g.

The core may include artificial graphite, and may specifically be composed of the artificial graphite.

Since the artificial graphite has excellent lithium absorption capacity, energy density of a negative electrode is improved when the negative electrode active material includes the artificial graphite, and thus, charge and discharge characteristics of a secondary battery, particularly, efficiency of the secondary battery may be improved.

The artificial graphite may be a secondary particle formed of a plurality of primary particles. Since the artificial graphite in the form of a secondary particle has less sites causing a side reaction with an electrolyte solution than a single particle, a side reaction between the electrolyte solution and the negative electrode may be suppressed. The primary particle may also correspond to artificial graphite.

Each primary particle may have an average particle diameter ($D_{50}$) of 7 μm to 10 μm, particularly 8 μm to 9 μm, and more particularly 8.5 μm to 8.7 μm. In a case in which the average particle diameter satisfies the above range, rapid charging performance of the secondary battery may be improved.

The secondary particle may be formed by assembly of the plurality of primary particles. Specifically, the artificial graphite may be formed by bonding at least two primary particles together, and, more specifically, the primary particles may be bonded to each other by the medium of materials which are formed by graphitization of a carbonaceous precursor such as a pitch binder. The artificial graphite may have a curved surface and, for example, may be in the form of a flake or in the form of a spike. Each artificial graphite (secondary particle) may have an average particle diameter ($D_{50}$) of 15 μm to 20 μm, particularly 16 μm to 17 μm, and more particularly 16.2 μm to 17 μm. In a case in which the above range is satisfied, a high level of capacity and efficiency of the secondary battery may be achieved, and the rapid charging performance of the secondary battery may be improved.

The FIGURE is a schematic view of artificial graphite. Referring to The FIGURE, the artificial graphite includes layers in which hexagonal rings consisting of six carbon atoms are planarly connected. The layers are stacked in parallel, and, specifically, the layers are stacked in a direction. A plane perpendicular to the stacking direction, that is, a plane of each layer is a basal plane ((a) of the FIGURE), and the basal plane may correspond to a (0001) plane. Also, in the artificial graphite in the form of a particle, edges of each of the basal planes gather to constitute an edge plane ((b) of the FIGURE). The edge plane is not composed of only carbon atoms in the same plane, but a plurality of planes may be present in a zig-zag shape. The edge plane is present in a direction generally perpendicular or close to perpendicular to the basal plane.

The edge plane includes carbon atoms which are not present on the same plane, and corresponds to a place where the sites causing the side reaction with the electrolyte solution are most abundant. Thus, the present invention has a feature in that the side reaction with the electrolyte solution is controlled by using artificial graphite with a low specific surface area of the edge plane as the negative electrode active material. Also, since an amount of the carbon coating layer is small, the specific surface area of the edge plane of the artificial graphite is similar to a specific surface area of an edge plane of the negative electrode active material, despite the presence of the carbon coating layer.

The carbon coating layer may be disposed on the core. Specifically, the carbon coating layer may cover at least a portion of the core, and, more specifically, the carbon coating layer may cover the entire core.

Since the carbon coating layer may facilitate insertion and release of lithium ions into and from the artificial graphite or may reduce diffusion resistance of lithium ions, the carbon coating layer may contribute to the improvement of the rapid charging performance. Also, the carbon coating layer may improve hardness of the negative electrode active material, and, accordingly, the carbon coating layer may improve structural stability of the negative electrode active material and may minimize structural changes during roll pressing.

The carbon coating layer may include soft carbon, and may be specifically composed of the soft carbon. In a case in which the soft carbon, instead of hard carbon, is used, high-temperature storage performance of the battery may be improved.

The carbon coating layer may be included in an amount of 3 wt % to 5 wt %, for example, 3.5 wt % to 4.5 wt % in the negative electrode active material. In a case in which the above range is satisfied, the rapid charging performance may be improved while achieving sufficiently high discharge capacity and initial efficiency.

The edge plane of the negative electrode active material may have a specific surface area of 1.0 m²/g to 1.9 m²/g, particularly 1.3 m²/g to 1.9 m²/g, and more particularly 1.5 m²/g to 1.7 m²/g. In a case in which the specific surface area is less than 1.0 m²/g, since resistance to charge transfer is excessively increased, the rapid charging performance of the battery may be degraded. In contrast, in a case in which the specific surface area is greater than 1.9 m²/g, since reactivity between the negative electrode and the electrolyte solution is excessively high, durability of the battery is reduced in high-temperature storage and high-temperature cycles. Thus, in a case in which the above range is satisfied, a battery having a high level of rapid charging performance and capable of maintaining high-temperature performance may be derived.

The specific surface area of the edge plane of the negative electrode active material may be measured by the following method. After obtaining a nitrogen adsorption specific surface area (Brunauer-Emmett-Teller (BET)) of the negative electrode active material by a nitrogen adsorption method, a defect edge plane, a basal plane, and a prismatic edge plane may be quantized from the nitrogen adsorption specific surface area by a density functional theory. This is due to the fact that carbon atom densities of each of the defect edge plane, the base plane, and the prismatic edge plane are different, and the higher the carbon atom density is, the larger the adsorption energy is. In this case, a sum of specific surface areas of the defect edge plane and the prismatic edge plane is regarded as the specific surface area of the edge plane. An instrument used for the measurement may be ASAP2000 (Accelerated Surface Area and Porosimetry System).

<Method of Preparing Negative Electrode Active Material>

A method of preparing a negative electrode active material according to another embodiment of the present invention may include: preparing needle cokes; crushing the needle cokes at a pressure of 10 MPa to 20 MPa; after mixing the crushed needle cokes with a carbonaceous precursor, preparing a core by performing a heat treatment at a temperature of 3,000° C. or more; and forming a carbon coating layer on the core. According to the above preparation method, the negative electrode active material according to the above-described embodiment may be prepared.

In the preparing of the needle cokes, the needle cokes are classified into coal-based needle cokes and petroleum-based needle cokes, and it is preferable that the needle cokes used in the present invention are the petroleum-based needle cokes. Since the needle cokes include an acicular structure and crystallite arrangement is somewhat random, it is more advantageous for diffusion of lithium ions when the negative electrode active material is prepared by using the needle cokes.

An effect of the negative electrode active material of the present invention may not be achieved using mosaic cokes. Since the mosaic cokes has a round shape, in which an amount of the acicular structure is less than that of the needle cokes, and crystallites are more regularly arranged, the diffusion of the lithium ions is difficult when the negative electrode active material is prepared by using the mosaic cokes.

The needle cokes may have an average particle diameter ($D_{50}$) of 4 μm to 6 μm, particularly 4.5 μm to 5.5 μm, and more particularly 4.8 μm to 5.2 μm. In a case in which the above range is satisfied, the needle cokes may be easily crushed by an appropriate crushing pressure.

In the crushing of the needle cokes at a pressure of 10 MPa to 20 MPa, the crushing may be performed by at least one method selected from the group consisting of a crushing process, a crushing mixing process, a heat-treated coal crushing process, and a crushed coal process. Specifically, since the crushing mixing process may more easily crush the needle cokes by applying uniform pressure and heat, it is the most preferable.

The pressure used in the crushing may be in a range of 10 MPa to 20 MPa, particularly 12 MPa to 18 MPa, and more particularly 14 MPa to 16 MPa. In a case in which the pressure is less than 10 MPa, since the needle cokes are not crushed to the desired degree, it is difficult to obtain even and uniformly crushed needle cokes. In contrast, in a case in which the pressure is greater than 20 MPa, the needle cokes are excessively crushed, and there is a limitation in that it is difficult to control the specific surface area of the edge plane of the negative electrode active material.

A jaw crusher, a gyratory crusher, a roll mill, or an edge runner may be used for the crushing.

In the preparing of the core by performing a heat treatment at a temperature of 3,000° C. or more after the mixing of the crushed needle cokes with a carbonaceous precursor, the carbonaceous precursor may be at least one material selected from the group consisting of a pitch binder, such as coal-tar pitch, rayon, and a polyacrylonitrile-based resin, or a precursor of the material.

The heat treatment may be performed in a reaction furnace to which the crushed needle cokes are added, and the heat treatment temperature may be a temperature of the reaction furnace. A core including the artificial graphite may be prepared by the heat treatment.

The heat treatment temperature may be 3,000° C. or more, particularly 3,000° C. to 3,500° C., and more particularly 3,200° C. to 3,400° C. In a case in which the temperature is less than 3,000° C., since a degree of graphitization and a degree of crystallinity of the artificial graphite prepared are low, capacity of the negative electrode active material may be low. That is, since an artificial graphite with a high degree of graphitization and a high degree of crystallinity may be prepared only when the heat treatment is performed at a temperature of 3,000° C. or more, sufficient discharge capacity and efficiency may be achieved.

The heat treatment may be performed for 8 hours to 12 hours, particularly 9 hours to 11 hours, and more particularly 10 hours to 11 hours. In a case in which the above-described time is satisfied, since artificial graphite with a high degree of graphitization and a high degree of crystallinity may be prepared, sufficient discharge capacity and efficiency may be achieved.

In the forming of the carbon coating layer on the core, the carbon coating layer may be soft carbon. After the at least one material selected from the group consisting of a pitch binder, such as coal-tar pitch, rayon, and a polyacrylonitrile-based resin, or the precursor of the material is provided to a surface of the core, the carbon coating layer may be formed by performing a heat treatment on the material or the precursor of the material. The heat treatment process for the formation of the carbon coating layer may be performed in a temperature range of 1,000° C. to 4,000° C. in terms of promoting uniform formation of the coating layer.

As described above, in order to prepare the negative electrode active material according to the embodiment of the present invention, that is, the negative electrode active material in which the edge plane has a specific surface area of 1.0 m$^2$/g to 1.9 m$^2$/g, cokes used in the preparation of the artificial graphite may be needle cokes, the needle cokes may be crushed at a crushing pressure of 10 MPa to 20 MPa, and the heat treatment may be performed at a temperature of 3,000° C. or more. Furthermore, in a case in which an amount of the carbon coating layer is maintained at a low level, the low specific surface area of the edge plane of the artificial graphite may lead to the low specific surface area of the edge plane of the negative electrode active material.

<Negative Electrode>

A negative electrode according to another embodiment of the present invention includes a current collector and a negative electrode active material layer disposed on the current collector, wherein the negative electrode active material layer includes a negative electrode active material, wherein the negative electrode active material includes a core including artificial graphite; and a carbon coating layer disposed on a surface of the core, wherein an edge plane of the negative electrode may have a specific surface area of 0.5 m$^2$/g to 1.1 m$^2$/g. The negative electrode may be prepared by using the negative electrode active material of the above-described embodiment. Specifically, the negative electrode active material mentioned in the present embodiment (negative electrode) means a form in which the negative electrode active material of the above-described embodiment is used in the preparation process and finally included in the negative electrode.

The negative electrode may include a current collector. The current collector is not particularly limited so long as it has conductivity without causing adverse chemical changes in the battery. For example, copper, stainless steel, aluminum, nickel, titanium, fired carbon, aluminum or stainless steel that is surface-treated with one of carbon, nickel, titanium, silver, or the like may be used. Specifically, a transition metal that absorbs carbon well, such as copper and nickel, may be used as the current collector. The current collector may have a thickness of 6 μm to 20 μm, but the thickness of the current collector is not limited thereto.

The negative electrode active material layer may be disposed on the current collector. The negative electrode active material layer may cover one surface or both surfaces of the current collector. The negative electrode active material layer may include a negative electrode active material and a binder. Specifically, the negative electrode active material layer may include the negative electrode active material, a conductive agent, and a binder.

The negative electrode active material may be in the form in which the negative electrode active material of the above-described embodiment is used in the preparation process and finally included in the negative electrode. Thus, characteristics of the negative electrode active material included in the negative electrode of the present embodiment may include all characteristics of the negative electrode active material of the above-described embodiment.

The negative electrode active material may be included in an amount of 92 wt % to 97 wt %, for example, 95.6 wt % to 95.9 wt % in the negative electrode active material layer. In a case in which the above range is satisfied, energy density of the negative electrode prepared may be at a sufficient level.

The binder may include various types of binder polymers such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with lithium (Li), sodium (Na), or calcium (Ca), or various copolymers.

Any conductive agent may be used without particular limitation so long as it has conductivity without causing adverse chemical changes in the battery, and, for example, a conductive material such as: a carbon black such as acetylene black, Ketjen black, channel black, furnace black, lamp black, and thermal black; conductive fibers such as carbon fibers and metal fibers; conductive tubes such as carbon nanotubes; fluorocarbon powder; metal powder such aluminum powder, and nickel powder; conductive whiskers such as zinc oxide whiskers and potassium titanate whiskers; conductive metal oxide such as titanium oxide; or polyphenylene derivatives may be used. The conductive agent may be preferably carbon black, and may be more specifically carbon black having an average particle diameter of a few tens of nanometers.

The negative electrode active material layer may have a porosity of 10% to 20%, particularly 12% to 16%, and more particularly 13% to 15%. In a case in which the porosity satisfies the above range, the rapid charging performance and durability at high temperatures of the battery may be improved. The porosity may be measured and calculated by the following method. Specifically, after the specific surface area of the negative electrode was measured by a nitrogen adsorption method using ASAP2000 (Accelerated Surface Area and Porosimetry System), the porosity was derived by using a BJT plotting program.

The edge plane of the negative electrode may have a specific surface area of 0.5 m$^2$/g to 1.1 m$^2$/g, particularly 0.5 m$^2$/g to 0.85 m$^2$/g, and more particularly 0.5 m$^2$/g to 0.80 m$^2$/g, for example, 0.70 m$^2$/g to 0.80 m$^2$/g. In a case in which the specific surface area is less than 0.5 m$^2$/g, since the resistance to charge transfer is excessively increased, the rapid charging performance of the battery may be degraded. In contrast, in a case in which the specific surface area is greater than 1.1 m$^2$/g, since the reactivity between the negative electrode and the electrolyte solution is excessively high, the loss of lithium ions is increased. Accordingly, the durability of the battery is reduced in high-temperature storage and high-temperature cycles. Thus, in a case in which the above range is satisfied, a battery having a high level of rapid charging performance and capable of maintaining high-temperature performance may be derived.

Also, the above range may be achieved when the negative electrode active material according to the embodiment of the present invention is used. That is, the edge plane of the negative electrode may have a specific surface area of 0.5 m$^2$/g to 1.1 m$^2$/g by including the negative electrode active material of the above-described embodiment having a specific surface area of the edge plane of 1.0 m$^2$/g to 1.9 m$^2$/g in the negative electrode slurry and being subjected to the subsequent negative electrode preparation process.

The specific surface area of the edge plane of the negative electrode may be measured by the following method. Samples are prepared by punching the prepared negative electrode into a size of 8 mm×8 mm, and 60 samples were put in a tube to measure a specific surface area by a nitrogen adsorption method. Thereafter, a specific surface area of each of a defect edge plane, a basal plane, and a prismatic edge plane is obtained by a density functional theory, and a sum of the specific surface areas of the defect edge plane and the prismatic edge plane is defined as the specific surface area of the edge plane of the negative electrode.

<Secondary Battery>

The present invention provides a secondary battery including a positive electrode, a negative electrode, an electrolyte solution, and a separator, wherein the negative electrode is the same as the above-described negative electrode according to the embodiment and the secondary battery may be a lithium secondary battery.

The secondary battery may be prepared according to a typical method known in the art. For example, the secondary battery may be prepared by disposing the separator between the positive electrode and the negative electrode and injecting the electrolyte solution in which a lithium salt is dissolved.

The positive electrode may include a positive electrode active material. A lithium transition metal oxide may be preferably used as the positive electrode active material, and, the positive electrode active material, for example, may be a mixture of at least one selected from the group consisting of $Li_{x1}CoO_2$ (0.5<x1<1.3), $Li_{x2}NiO_2$ (0.5<x2<1.3), $Li_{x3}MnO_2$ (0.5<x3<1.3), $Li_{x4}Mn_2O_4$ (0.5<x4<1.3), $Li_{x5}(Ni_{a1}Co_{b1}Mn_{c1})O_2$ (0.5<x5<1.3, 0<a1<1, 0<b1<1, 0<c1<1, a1+b1+c1=1), $Li_{x6}Ni_{1-y1}Co_{y1}O_2$ (0.5<x6<1.3, 0<y1<1), $Li_{x7}Co_{1-y2}Mn_{y2}O_2$ (0.5<x7<1.3, 0<y2<1), $Li_{x8}Ni_{1-y3}Mn_{y3}O_2$ (0.5<x8<1.3, 0<y3<1), $Li_{x9}(Ni_{a2}Co_{b2}Mn_{c2})O_4$ (0.5<x9<1.3, 0<a2<2, 0<b2<2, 0<c2<2, a2+b2+c2=2), $Li_{x10}Mn_{2-z1}Ni_{z1}O_4$ (0.5<x10<1.3, 0<z1<2), $Li_{x11}Mn_{2-z2}Co_{z2}O_4$ (0.5<x11<1.3, 0<z2<2), $Li_{x12}CoPO_4$ (0.5<x12<1.3), and $Li_{x13}FePO_4$ (0.5<x13<1.3).

A typical porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the lithium secondary battery according to the present invention. Also, a typical porous nonwoven fabric, for example, a nonwoven fabric formed of high melting point glass fibers or polyethylene terephthalate fibers may be used, but the separator is not limited thereto.

The electrolyte solution included in the lithium secondary battery according to the present invention may be a mixed organic solvent of at least one selected from the group consisting of propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, and butyl propionate.

Also, the electrolyte solution according to the present invention may further include a lithium salt, and an anion of the lithium salt may be at least one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The lithium secondary battery according to the present invention may be a cylindrical type secondary battery, a prismatic type secondary battery, and a pouch type secondary battery, but the lithium secondary battery is not limited thereto as long as it corresponds to a charge and discharge device.

Furthermore, the present invention provides a battery module including the lithium secondary battery as a unit cell and a battery pack including the battery module.

The battery pack may be used as a power source of at least one medium and large sized device selected from the group consisting of a power tool; electric cars including an electric vehicle (EV), a hybrid electric vehicle (HEV), and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1: Preparation of Negative Electrode Active Material

Needle cokes having an average particle diameter (DSO) of 5 μm were crushed at a pressure of 15 MPa by using a crusher. Thereafter, the crushed needle cokes were mixed with a pitch binder and the crushed needle cokes were then heat-treated at a temperature of 3,300° C. to prepare artificial graphite in the form of a secondary particle having an average particle diameter (DSO) of 17 μm.

Thereafter, after 800 g of the pitch binder was mixed with 20 kg of the artificial graphite and stirred, a heat treatment was performed at 2,000° C. for 3 hours to form a carbon coating layer on the artificial graphite. An amount of the carbon coating layer in the negative electrode active material thus prepared was 4 wt %.

Example 2: Preparation of Negative Electrode Active Material

A negative electrode active material of Example 2 was prepared in the same manner as in Example 1 except that the crushing pressure was 12 MPa.

Example 3: Preparation of Negative Electrode Active Material

A negative electrode active material of Example 3 was prepared in the same manner as in Example 1 except that the heat treatment temperature applied to the crushed needle cokes was 3,100° C.

Example 4: Preparation of Negative Electrode Active Material

A negative electrode active material of Example 4 was prepared in the same manner as in Example 1 except that an average particle diameter ($D_{50}$) of primary particles of the artificial graphite was 7 μm and an average particle diameter ($D_{50}$) of secondary particles of the artificial graphite was 15 μm by controlling crushing conditions.

Comparative Example 1: Preparation of Negative Electrode Active Material

A negative electrode active material of Comparative Example 1 was prepared in the same manner as in Example 1 except that natural graphite in the form of a secondary particle having an average particle diameter ($D_{50}$) of 15 μm was used instead of the artificial graphite in Example 1.

Comparative Example 2: Preparation of Negative Electrode Active Material

A negative electrode active material of Comparative Example 2 was prepared in the same manner as in Example 1 except that mosaic cokes were used instead of the needle cokes.

Comparative Example 3: Preparation of Negative Electrode Active Material

A negative electrode active material of Comparative Example 3 was prepared in the same manner as in Example 1 except that the crushing pressure was 28 MPa.

Comparative Example 4: Preparation of Negative Electrode Active Material

A negative electrode active material of Comparative Example 4 was prepared in the same manner as in Example 1 except that the crushing pressure was 36 MPa.

Comparative Example 5: Preparation of Negative Electrode Active Material

A negative electrode active material of Comparative Example 5 was prepared in the same manner as in Example 1 except that the heat treatment temperature applied to the crushed needle cokes was 2,800° C.

The specific surface areas of the edge planes of the negative electrode active materials were measured by the following method. After obtaining a nitrogen adsorption specific surface area (BET) of the negative electrode active material by a nitrogen adsorption method, a defect edge plane, a basal plane, and a prismatic edge plane were quantized from the nitrogen adsorption specific surface area by a density functional theory. In this case, a sum of specific surface areas of the defect edge plane and the prismatic edge plane was defined as the specific surface area of the edge plane. An instrument used for the measurement was ASAP2000 (Accelerated Surface Area and Porosimetry System). The average particle diameter ($D_{50}$) of the secondary particle of the negative electrode active material was measured by using a laser diffraction method.

Example 5: Preparation of Negative Electrode and Battery (1) Preparation of Negative Electrode The negative electrode active material of Example 1, a styrene butadiene rubber (SBR) and a carboxymethyl cellulose (CMC) as a binder, and super C65, as a conductive agent, were added to distilled water at a weight ratio of 95.6:1:2.3:1.1 and mixed to prepare a negative electrode slurry having a solid content of the mixture of 47%. The negative electrode slurry was coated on a 20 μm thick copper current collector and dried to prepare a preliminary electrode. In this case, a temperature of circulating air was 80° C. Subsequently, the preliminary electrode was roll-pressed at a pressure of Gap20, dried in a vacuum oven at 130° C. for 10 hours, and then punched into a coin-cell size of 1.4875 cm² to prepare a negative electrode including a negative electrode active material layer. A loading amount of the negative electrode active material layer was 3.61 mAh/cm².

(2) Preparation of Battery

A lithium (Li) metal thin film cut into a circle of area 1.7671 cm² was used as a positive electrode. A lithium coin half-cell was prepared by disposing a porous polyethylene separator between the positive electrode and the negative electrode prepared as described above, and injecting an electrolyte solution in which 1 M $LiPF_6$ was dissolved in a solvent in which ethylene carbonate (EC) and diethyl car-

TABLE 1

| | Material | Cokes type | Crushing pressure (MPa) | Heat treatment temperature (° C.) | Average particle diameter (D50) of secondary particle (μm) | Specific surface area of edge plane (m²/g) |
|---|---|---|---|---|---|---|
| Example 1 | Artificial graphite | Needle cokes | 15 | 3300 | 17 | 1.5 |
| Example 2 | Artificial graphite | Needle cokes | 12 | 3300 | 17 | 1.25 |
| Example 3 | Artificial graphite | Needle cokes | 16 | 3100 | 17 | 1.40 |
| Example 4 | Artificial graphite | Needle cokes | 14 | 3300 | 15 | 1.78 |
| Comparative Example 1 | Natural graphite | — | — | — | 15 | 2.48 |
| Comparative Example 2 | Artificial graphite | Mosaic cokes | 15 | 3300 | 17 | 2.89 |
| Comparative Example 3 | Artificial graphite | Needle cokes | 28 | 3300 | 17 | 2.21 |
| Comparative Example 4 | Artificial graphite | Needle cokes | 36 | 3300 | 17 | 2.78 |
| Comparative Example 5 | Artificial graphite | Needle cokes | 15 | 2800 | 17 | 2.65 | bonate (DEC) were mixed in a volume ratio of 1:4 and 0.5 wt % of vinylene carbonate was mixed.

Example 6: Preparation of Negative Electrode and Battery

A negative electrode and a battery were prepared in the same manner as in Example 5 except that roll pressing was performed at a pressure of Gap10 during the preparation of the negative electrode.

Examples 7 to 9: Preparation of Negative Electrodes and Batteries

Negative electrodes and batteries were prepared in the same manner as in Example 5 except that each of the negative electrode active materials of Examples 2 to 4 was used instead of the negative electrode active material of Example 1.

Comparative Examples 6 to 10: Preparation of Negative Electrodes and Secondary Batteries Negative electrodes and batteries were prepared in the same manner as in Example 5 except that each of the negative electrode active materials of Comparative Examples 1 to 5 was used instead of the negative electrode active material of Example 1.

Comparative Example 11: Preparation of Negative Electrode and Secondary Battery

A negative electrode and a secondary battery were prepared in the same manner as in Example 5 except that the negative electrode active material of Comparative Example 3 was used instead of the negative electrode active material of Example 1, and roll pressing was performed at a pressure of Gap5 during the preparation of the negative electrode.

TABLE 2

|  | Negative electrode active material | Specific surface area of edge plane of negative electrode | Porosity of negative electrode (%) |
| --- | --- | --- | --- |
| Example 5 | Example 1 | 0.75 | 14 |
| Example 6 | Example 1 | 0.80 | 15 |
| Example 7 | Example 2 | 0.58 | 10 |
| Example 8 | Example 3 | 0.82 | 15 |
| Example 9 | Example 4 | 0.95 | 18 |
| Comparative Example 6 | Comparative Example 1 | 1.50 | 30 |
| Comparative Example 7 | Comparative Example 2 | 1.28 | 27 |
| Comparative Example 8 | Comparative Example 3 | 1.37 | 28 |
| Comparative Example 9 | Comparative Example 4 | 1.45 | 29 |
| Comparative Example 10 | Comparative Example 5 | 1.62 | 31 |
| Comparative Example 11 | Comparative Example 3 | 2.08 | 36 |

The specific surface area of the edge plane of the negative electrode was obtained by the following method. Samples were prepared by punching the negative electrode into a size of 8 mm×8 mm, and 60 samples were put in a tube to measure a specific surface area by a nitrogen adsorption method. Thereafter, a specific surface area of each of a defect edge plane, a basal plane, and a prismatic edge plane was obtained by a density functional theory, and a sum of the specific surface areas of the defect edge plane and the prismatic edge plane was defined as the specific surface area of the edge plane of the negative electrode. An instrument used for the measurement was ASAP2000 (Accelerated Surface Area and Porosimetry System). After the specific surface area of the negative electrode was measured by a nitrogen adsorption method using ASAP2000 (Accelerated Surface Area and Porosimetry System), the porosity (%) of the negative electrode was derived by using a BJT plotting program.

Experimental Example 1: Evaluation of Initial Efficiency and Capacity Retention After High-temperature Storage Initial capacity and capacity retention after high-temperature storage were evaluated for each of the batteries of Examples 5 to 9 and Comparative Examples 6 to 11.

Specifically, after each of the batteries was left standing for 24 hours from the injection of the electrolyte solution, each of the batteries was constant-current charged at 0.1 C-rate and was then constant-voltage (CV) charged at 0.005 V. Thereafter, each battery was discharged at 0.1 C-rate to 1.5 V. Initial efficiency was evaluated during the first charge and discharge cycle as described above.

Thereafter, after two additional charge and discharge cycles were performed, the battery at a state of charge (SOC) of 90% was stored in a reaction furnace at 60° C. for 4 weeks. Thereafter, capacity retention was evaluated by checking remaining capacity while discharging the battery at 0.1 C.

Capacity retention(%)=(discharge capacity after high-temperature storage/initial discharge capacity)×100

TABLE 3

|  | Specific surface area of edge plane of negative electrode | Initial efficiency (%) | Capacity retention (%) |
| --- | --- | --- | --- |
| Example 5 | 0.75 | 94.2 | 94.8 |
| Example 6 | 0.80 | 93.1 | 93.1 |
| Example 7 | 0.58 | 93.9 | 93.6 |
| Example 8 | 0.82 | 92.9 | 92.8 |
| Example 9 | 0.95 | 92.6 | 91.1 |
| Comparative Example 6 | 1.50 | 91.9 | 90.8 |
| Comparative Example 7 | 1.28 | 92.1 | 91.0 |
| Comparative Example 8 | 1.37 | 92.0 | 90.8 |
| Comparative Example 9 | 1.45 | 91.8 | 89.1 |
| Comparative Example 10 | 1.62 | 91.5 | 88.7 |
| Comparative Example 11 | 2.08 | 90.3 | 85.4 |

Referring to Table 3, with respect to the batteries (Examples 5 to 9) using the negative electrodes in which the specific surface area of the edge plane according to the above measurement method was in a range of 0.5 $m^2$/g to 1.1 $m^2$/g, it may be understood that initial efficiencies and capacity retentions during high-temperature storage were higher than those of the batteries (Comparative Examples 6 to 11) using the negative electrodes in which the specific surface area of the edge plane was not in a range of 0.5 $m^2$/g to 1.1 $m^2$/g.

The invention claimed is:

1. A negative electrode active material comprising:
a core comprising artificial graphite; and
a carbon coating layer disposed on a surface of the core,
wherein an edge plane of the negative electrode active material has a specific surface area of 1.0 $m^2/g$ to 1.9 $m^2/g$.

2. The negative electrode active material of claim 1, wherein the artificial graphite is a secondary particle formed of a plurality of primary particles.

3. The negative electrode active material of claim 2, wherein each primary particle has an average particle diameter ($D_{50}$) of 7 μm to 10 μm.

4. The negative electrode active material of claim 2, wherein each artificial graphite secondary particle has an average particle diameter ($D_{50}$) of 15 μm to 20 μm.

5. The negative electrode active material of claim 1, wherein the carbon coating layer comprises soft carbon.

6. The negative electrode active material of claim 1, wherein the carbon coating layer is present in an amount of 3 wt % to 5 wt % in the negative electrode active material.

7. A method of preparing a negative electrode active material, the method comprising:
preparing needle cokes;
crushing the needle cokes at a pressure of 10 MPa to 20 MPa;
mixing the crushed needle cokes with a carbonaceous precursor, and preparing a core by performing a heat treatment at a temperature of 3,000° C. or more; and
forming a carbon coating layer on a surface of the core.

8. The method of claim 7, wherein the needle cokes have an average particle diameter ($D_{50}$) of 4 μm to 6 μm.

9. The method of claim 7, wherein the heat treatment is performed for 8 hours to 12 hours.

10. A negative electrode comprising:
a current collector; and
a negative electrode active material layer disposed on the current collector,
wherein the negative electrode active material layer comprises a negative electrode active material,
wherein the negative electrode active material comprises a core comprising artificial graphite; and a carbon coating layer disposed on a surface of the core,
wherein an edge plane of the negative electrode has a specific surface area of 0.5 $m^2/g$ to 1.1 $m^2/g$.

11. The negative electrode of claim 10, wherein the negative electrode active material comprises:
a core comprising artificial graphite; and
a carbon coating layer disposed on a surface of the core,
wherein an edge plane of the negative electrode active material has a specific surface area of 1.0 $m_2/g$ to 1.9 $m^2/g$.

12. The negative electrode of claim 10, wherein the negative electrode active material layer has a porosity of 10% to 20%.

13. A secondary battery comprising:
the negative electrode of claim 10;
a positive electrode;
a separator disposed between the positive electrode and the negative electrode; and
an electrolyte.

* * * * *